United States Patent
Frank et al.

(10) Patent No.: US 11,137,024 B2
(45) Date of Patent: Oct. 5, 2021

(54) ANGULAR CONTACT ROLLER BEARING

(71) Applicant: IMO HOLDING GMBH, Gremsdorf (DE)

(72) Inventors: Hubertus Frank, Hoechstadt (DE); Erich Russ, Gremsdorf (DE)

(73) Assignee: IMO HOLDING GMBH, Gremsdorf (DE)

( * ) Notice: Subject to any disclaimer, the term of this patent is extended or adjusted under 35 U.S.C. 154(b) by 0 days.

(21) Appl. No.: 16/649,023

(22) PCT Filed: Sep. 6, 2018

(86) PCT No.: PCT/EP2018/073944
§ 371 (c)(1),
(2) Date: Mar. 19, 2020

(87) PCT Pub. No.: WO2019/057500
PCT Pub. Date: Mar. 28, 2019

(65) Prior Publication Data
US 2020/0291994 A1 Sep. 17, 2020

(30) Foreign Application Priority Data
Sep. 21, 2017 (DE) .................. 10 2017 008 877.2

(51) Int. Cl.
*F16C 19/28* (2006.01)
*F16C 19/38* (2006.01)
(Continued)

(52) U.S. Cl.
CPC ............ *F16C 19/385* (2013.01); *F16C 19/28* (2013.01); *F16C 33/34* (2013.01); *F16C 33/366* (2013.01);
(Continued)

(58) Field of Classification Search
CPC ...... F16C 19/28; F16C 19/385; F16C 19/386; F16C 33/34; F16C 33/366; F16C 2240/30;
(Continued)

(56) References Cited

U.S. PATENT DOCUMENTS 1,224,346 A  5/1917  Wingquist
1,418,277 A  6/1922  Birgh
(Continued)

FOREIGN PATENT DOCUMENTS

AT  76305 B  5/1919
CH  72303 A  5/1916
(Continued)

*Primary Examiner* — Marcus Charles
(74) *Attorney, Agent, or Firm* — Tarolli, Sundheim, Covell & Tummnio LLP

(57) ABSTRACT

The invention relates to an angular contact roller bearing having an inner ring and an outer ring, between which two or more raceways for a plurality of rolling elements are formed, the rolling elements being designed to roll in their respective raceways in the circumferential direction of the angular contact roller bearing, and the raceways and the rolling elements having cross-sections corresponding to one another at least approximately. A cross-section of a rolling element containing the central longitudinal axis has an at least approximately rectangular design and an imaginary diagonal through the cross-section of the rolling element which for all rolling elements on a raceway of the angular contact roller bearing is arranged on an imaginary surface at least approximately in the form of a cylindrical casing. The ratio of a transverse dimension of the rolling element to its length is characteristic of an angle at which the raceway of the rolling element is inclined relative to the central longitudinal axis of the angular contact roller bearing.

6 Claims, 4 Drawing Sheets

(51) Int. Cl.
*F16C 33/34* (2006.01)
*F16C 33/36* (2006.01)

(52) U.S. Cl.
CPC ...... *F16C 2240/30* (2013.01); *F16C 2300/14* (2013.01)

(58) Field of Classification Search
CPC .............. F16C 2240/34; F16C 2300/14; F16C 2360/31; F16H 2057/085
USPC .................. 384/560, 564–565, 571, 572
See application file for complete search history.

(56) References Cited

U.S. PATENT DOCUMENTS

| | | | |
|---|---|---|---|
| 1,552,031 A | | 9/1925 | Birgh |
| 1,970,699 A | | 8/1934 | Hermann |
| 2,055,714 A | | 9/1936 | Baker |
| 3,850,485 A | * | 11/1974 | Zimmer ................ F16C 19/385 384/558 |
| 4,906,113 A | * | 3/1990 | Sague ..................... E02F 9/12 384/507 |
| 5,104,239 A | * | 4/1992 | Sague ..................... F16C 19/38 29/898.01 |
| 8,753,019 B2 | * | 6/2014 | Kikuchi ................ F16C 19/38 384/551 |
| 9,188,161 B2 | * | 11/2015 | Bouron ................... F16C 19/38 |
| 9,341,249 B2 | * | 5/2016 | Bouron ................... F16C 19/38 |
| 9,422,984 B2 | * | 8/2016 | Pedersen .................. C21D 1/18 |

FOREIGN PATENT DOCUMENTS

| | | | | |
|---|---|---|---|---|
| DE | 607263 C | | 12/1934 | |
| DE | 6926219 U | | 6/1971 | |
| DE | 8713304 U1 | | 11/1987 | |
| DE | 3740805 A1 | * | 6/1988 | ............. F16C 23/10 |
| DE | 102004058905 A1 | * | 6/2006 | ............ F16C 35/067 |
| DE | 102011002913 A1 | | 4/2012 | |
| DE | 102013208203 A1 | | 11/2014 | |
| DE | 202014010876 U1 | | 4/2017 | |
| EP | 0756095 A2 | | 1/1997 | |
| EP | 2623805 A1 | | 8/2013 | |
| GB | 407272 A | | 3/1934 | |
| GB | 2199621 A | | 7/1988 | |
| JP | S5790416 A | | 6/1982 | |
| JP | 2002013540 A | | 1/2002 | |
| JP | 2007298086 A | * | 11/2007 | ............ F16C 35/063 |
| KR | 20140020899 A | * | 2/2014 | ............. F16C 19/38 |
| WO | WO-2009134684 A1 | * | 11/2009 | ............ F16H 1/2836 |
| WO | WO-2013043822 A2 | * | 3/2013 | ............ F16C 19/386 |

* cited by examiner (1) $alpha = k * atan(D/L)$;
(2) $0.75 <= k <= 1.25$;

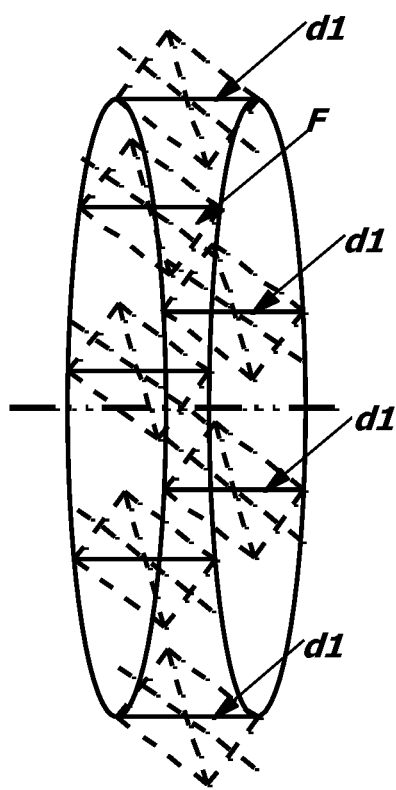 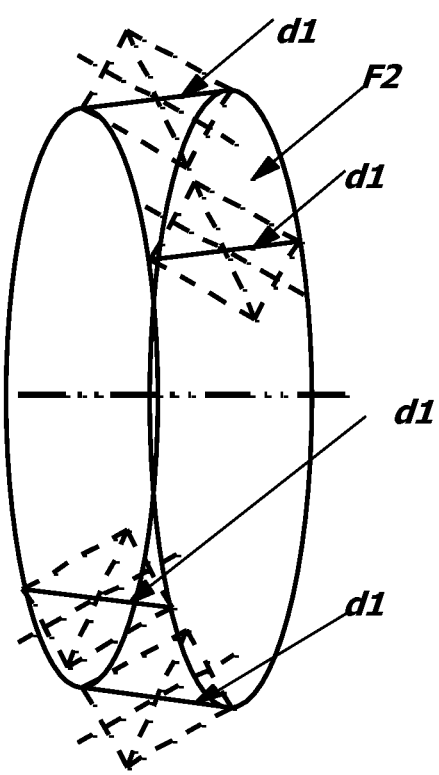
Fig. 2a  Fig. 2b

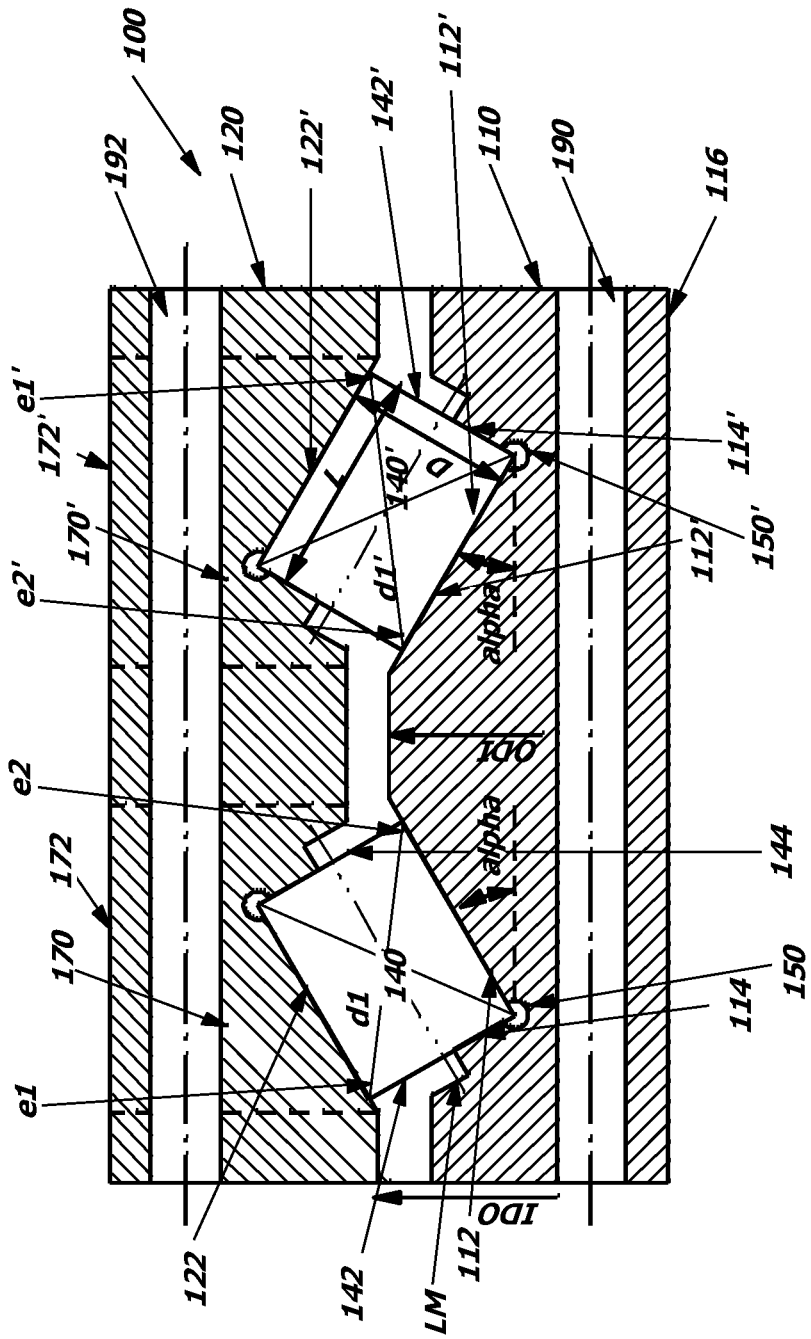

ANGULAR CONTACT ROLLER BEARING

CROSS-REFERENCE TO RELATED APPLICATIONS

This application is a U.S. National Stage Application filed under 35 U.S.C. § 371 of PCT/EP2018/073944, filed Sep. 6, 2018, and entitled ANGULAR CONTACT ROLLER BEARING, which International Application claims the benefit of priority from German Patent Application No. 10 2017 008 877.2, filed on Sep. 21, 2017. The entire contents of each of the above-identified patent applications are incorporated herein by reference.

SUBJECT

An angular contact roller bearing described herein is a multi-row rolling bearing in the form of a large-size bearing, which serves for the bearing of shafts. It can be used, for example, in large-scale power plants, such as in wind energy plants or hydroelectric power stations.

In the following, large-scale bearings denotes bearings which have an outer ring with a diameter of at least one meter. Other criteria, and in particular also other diameter values, can also be used to define large-size bearings. The important factor is that they are bearings which are significantly larger than those which are conventionally used in everyday applications, such as, for example, in passenger cars, and which have an outside diameter of a few centimeters.

In the case of large-size bearings, the outlay in terms of mounting, repair possibilities, etc. come to the fore. There are thus known, for example, large-size bearings having an inner ring and an outer ring which are each composed in the peripheral direction of multiple segments. Segmentation has the result, for example, that, if a bearing becomes damaged, it is possible to replace the bearing without dismantling the mounted shaft.

BACKGROUND AND PRIOR ART

A multi-row rolling bearing is known, for example, from DE 10 2011 002 913 A1, which bearing has the following features: a first and a second bearing ring which are arranged adjacent to one another and concentrically in the axial direction. These two bearing rings together form either an inner ring or an outer ring of the rolling bearing. In multi-row rolling bearings of this type, the bearing clearance or the preload along the periphery of the rolling bearing is adjusted, for example, by means of an angle ring screwed on at the side. In the field of multi-row rolling bearings there is the problem that forces within the bearing must be guided and absorbed differently compared to conventional bearings. For example, this affects multi-row rolling bearings having more than one inner and/or outer ring. In such bearings, it is necessary to guide the forces and moments between the individual components of the bearing. In the case of large-size bearings, setting the optimum bearing clearance or the optimum preload is costly in terms of personnel and time and involves a high risk of error.

Problem

The manufacturing and mounting costs and also the outlay in terms of maintenance of angular contact roller bearings in (wind) energy plants, for example, are to fall.

Solution

In conventional angular contact roller bearings and tapered roller bearings, the bearing clearance is dependent on many factors. For example, fit tolerances, the individual heights of the inner or outer rings, the contact force of the angle ring and the applied screw preload are included in the bearing clearance or the preload of the rolling bearing. In the case of the solution presented here, the bearing clearance or the bearing preload no longer has to be set individually for angular contact roller bearings on mounting thereof. The possibilities for error which arise in the case of conventional angular contact roller bearings due to uncertainties about the actual size of the fit of the position tolerance of the angle ring, the axial bearing seat and the fluctuations in the screw preload are thus eliminated. A difference with respect to conventional angular contact roller bearings is that, in the angular contact roller bearing presented here, the inner ring or the outer ring is not split for clearance or preload setting and also does not have to consist of at least two or three individual rings.

Instead, the angular contact roller bearing presented here has only an inner ring—which is not split in the axial direction—and an outer ring—which is not split in the axial direction, between which two or more raceways for a plurality of rolling elements are formed. This does not prevent the inner ring and/or the outer ring from being segmented in the peripheral direction.

The angular contact roller bearing has a plurality of rolling elements which are adapted to roll in their respective raceways in the peripheral direction of the angular contact roller bearing. The raceways and the rolling elements have cross-sections which correspond at least approximately to one another. A cross-section of a rolling element containing the central longitudinal axis has an at least approximately square or rectangular form. The rolling elements can also have a barrel shape. A cross-section of a rolling element containing the central longitudinal axis is thereby convexly curved at its longitudinal sides facing the raceways. In the case of rolling elements of conical shape, a cross-section of a rolling element containing the central longitudinal axis is trapezoidal. This cross-section of the rolling element is at least approximately quadrangular and has two—imaginary—diagonals. One of the diagonals through this cross-section of the rolling element lies for all the rolling elements on a raceway of the angular contact roller bearing on an at least approximately cylinder-envelope-shaped surface. This—first—diagonal extends approximately parallel to the central longitudinal axis of the angular contact roller bearing. This form contributes towards making it unnecessary to split the inner or outer ring in the axial direction. The ratio of the diameter of the rolling element to its length thereby gives the angle at which the raceway of the rolling elements is inclined relative to the central longitudinal axis of the angular contact roller bearing.

In a variant, the raceway of the angular contact roller bearing is so inclined relative to the central longitudinal axis of the angular contact roller bearing that one end of the diagonals is located slightly above and the opposite end of the diagonals is located slightly below the—imaginary—cylinder-envelope-shaped surface. In this variant, the cylinder-envelope-shaped surface on which the diagonals for all the rolling elements on a raceway of the angular contact roller bearing lie is mutated into a frustum-envelope-shaped surface. This has the effect that the running surfaces of the rolling elements contact the raceway of the angular contact roller bearing as completely as possible. When longer rolling elements are used, the raceway of the angular contact roller bearing is inclined flatter relative to the central longitudinal axis of the angular contact roller bearing; in the case of shorter rolling elements, it is inclined correspondingly more steeply. The determining factor here is the ratio of the diameter (at the ends) to the length of the rolling element.

In contrast to conventional angular contact roller bearings, in a variant of the angular contact roller bearing presented here the raceways worked into the inner ring or the outer ring are open on a side flank. In the case of an X-arrangement of the angular contact roller bearing, only the inner side flank of the raceway worked into the inner ring and the outer side flank of the raceway worked into the outer ring have a respective shoulder on which a respective end face of the rolling element rests. The outer side edge of the raceway worked into the inner ring and the inner side edge of the raceway worked into the outer ring protrude in the case of an X-arrangement beyond the respective end face of the rolling element in the direction towards the longitudinal center axis thereof.

In the case of an O-arrangement of the angular contact roller bearing, only the outer side flank of the raceway worked into the inner ring and the inner side flank of the raceway worked into the outer ring have a respective shoulder on which a respective end face of the rolling element rests. The inner side edge of the raceway worked into the inner ring and the outer side edge of the raceway worked into the outer ring protrude in the case of an O-arrangement beyond the respective end face of the rolling element in the direction towards the longitudinal center axis thereof.

At least at the respective open side edges, that is to say the side edges without a shoulder, the raceway is at least as wide as the rolling elements are long. Each rolling element thus contributes to receiving the load over its entire length. The raceway is surface-finished/hardened over its entire width. Pitting with impressions in the raceway and the surrounding bead is at least reduced by means of these forms and measures.

Because the inner ring and the outer ring are each not split in the direction of the central longitudinal axis of the angular contact roller bearing, the construction presented here has greater stiffness. The bearing clearance/preload is to be set by the manufacturer. The angular contact roller bearing can thus immediately be screwed to the inner and outer ring with its attachment structure without adjustment work. In some variants of the angular contact roller bearing presented here, the rolling elements are held at a predefined distance from one another by suitable intermediate pieces or cage segments.

For mounting the rolling elements between the inner ring and the outer ring of the angular contact roller bearing, filling openings which can be closed by filler plugs are provided for each raceway, which filling openings extend radially from the outer surface of the outer ring through the outer ring to the raceway. The filling openings can also extend radially from the inner surface of the inner ring through the inner ring to the raceway. The filling openings can also be arranged offset along the periphery. The filler plugs are secured with pins or a suitable screw connection.

Shaft seals or other seals against grease or lubricant losses which are likewise provided on the angular contact roller bearing are not discussed in greater detail here.

BRIEF DESCRIPTION OF THE DRAWING

An angular contact roller bearing in its embodiments and variants will be described in greater detail hereinbelow with reference to the drawing.

FIG. 2a shows, in a schematic perspective side view, a first variant of the orientation of the rolling elements of the angular contact roller bearing of FIG. 1.

FIG. 2b shows, in a schematic perspective side view, a second variant of the orientation of the rolling elements of the angular contact roller bearing of FIG. 1.

FIG. 3 shows, in a schematic sectional side view, the schematic construction of a variant of the angular contact roller bearing of FIG. 1.

DETAILED DESCRIPTION OF THE DRAWING

Exemplary embodiments of the angular contact roller bearing disclosed herein will be described in greater detail and explained in respect of their construction and their mode of functioning hereinbelow in connection with FIG. 1 to FIG. 3. An exemplary embodiment of a multi-row, here two-row, angular contact roller bearing according to a first exemplary embodiment will first be described in connection with FIG. 1.

Figure 1:
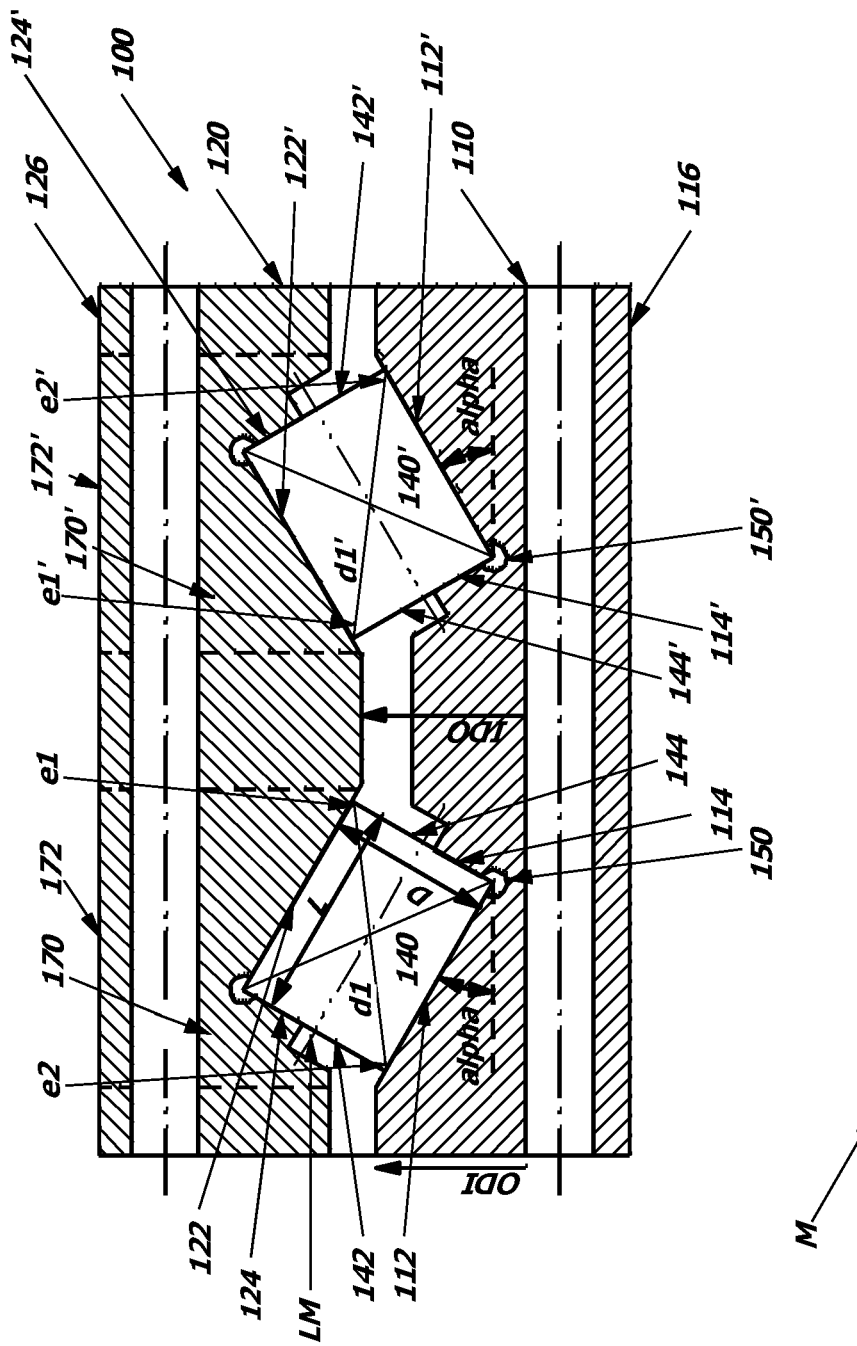
FIG. 1 shows, in a schematic sectional side view, the schematic construction of an angular contact roller bearing.

FIG. 1 shows a cross-sectional representation of a two-row cylindrical roller bearing 100 as an exemplary embodiment of a multi-row angular contact roller bearing. The cylindrical roller bearing comprises a first, inner bearing ring or inner ring 110 and a second, outer bearing ring or outer ring 120. The two bearing rings 110, 120 are arranged concentrically with respect to one another, relative to a central longitudinal axis M of the rolling or angular contact roller bearing 100, wherein the inner ring 110 is surrounded by the outer ring 120. The angular contact roller bearing 100 further has, between the inner ring 110 and the outer ring 120, a plurality of circular-cylindrical first rolling elements 140 in a first row. The first rolling elements 140 are guided in an optional cage, which is not illustrated in greater detail, or with intermediate pieces (spacers). The cage can also be in the form of a flexible cage, for example. FIG. 1 shows only one of the first rolling elements 140. Correspondingly, second frustoconical rolling elements 140' are arranged in a second row between the inner ring 110 and the outer ring 120, which second rolling elements can likewise be guided in a second optional cage or with intermediate pieces (spacers). FIG. 1 again shows only one of the second rolling elements 140'.

Between the one inner ring 110 and the one outer ring 120 there are formed on each of the rings 110, 120 for each row of rolling elements 140, 140' in each case a raceway 112, 122; 112', 122' for the respective row of rolling elements 140, 140'. The rolling elements 140, 140' are adapted to roll in their respective raceways 112, 122; 112', 122' in the peripheral direction of the angular contact roller bearing 100. As can be seen, the paired raceways 112, 122; 112', 122' of the first and second rows of rolling elements 140, 140' and the rolling elements 140, 140' form cross-sections, here approximately rectangular cross-sections, which correspond at least approximately to one another.

A cross-section of a rolling element 140, 140' containing the central longitudinal axis LM has an at least approximately quadrangular shape and an imaginary diagonal d1 through the cross-section of the rolling element 140, 140'. In the variant according to FIG. 1, this imaginary diagonal d1 is arranged for all the rolling elements 140, 140' on a raceway 112, 122; 112', 122' of the angular contact roller bearing 100 at least approximately on an imaginary, cylinder-envelope-shaped surface F. This imaginary, cylinder-envelope-shaped surface F is illustrated in FIG. 2a. A ratio of a transverse dimension D of the rolling element 140, 140' to its length L is characteristic of an angle alpha at which the raceway 112, 122; 112', 122' of the rolling elements 140, 140' is inclined relative to the central longitudinal axis M of the angular contact roller bearing 100.

In variants of the angular contact roller bearing in which the imaginary diagonal d1 for all the rolling elements 140, 140' on a raceway 112, 122; 112', 122' of the angular contact roller bearing 100 is arranged exactly on the imaginary, cylinder-envelope-shaped surface F, the angle alpha is given by the relationship alpha=k*a tan (transverse dimension D of the rolling element/length L of the rolling element), where k=1. In the case of cylindrical rollers as the rolling elements, the transverse dimension D of the rolling element is its diameter. In the case of tapered rollers as the rolling elements, the rolling element has a diameter D of the large end face of the cone and a diameter d of the small end face of the cone.

In the angular contact roller bearing 100 in the variant according to FIG. 1, the raceway 112, 122; 112', 122' of the rolling elements 140, 140' of the angular contact roller bearing 100 is, more specifically, so inclined relative to the central longitudinal axis M of the angular contact roller bearing 100 that one end e1, e1' of the diagonals d1, d1' is located slightly above and the opposite end e2, e2' of the diagonals d1, d1' is located slightly below the imaginary cylinder-envelope-shaped surface F. In this case, the diagonals d1, d1' lie on a frustum-envelope-shaped surface F2, as is illustrated in FIG. 2b. The angle alpha is thereby determined by the relationship alpha=k*atan (transverse dimension D of the rolling element/length L of the rolling element, where 0.75<=k<=1.25. In the variant illustrated in FIG. 2b, the factor k=0.8.

In the angular contact roller bearings disclosed here, the raceways 112, 122; 112', 122' worked into the inner ring 110 and/or the outer ring 120 are open on a side flank. More specifically, in the angular contact roller bearing 100 according to FIG. 1, which illustrates the case of an O-arrangement of the angular contact roller bearing 100, only an inner side flank 114, 114' of the raceways 112, 112' worked into the inner ring 110 and an outer side flank 124, 124' of the raceways 122, 122' worked into the outer ring 120 have a respective shoulder on which a respective end face 142, 144; 142', 144' of the respective rolling element 140, 140' rests. On the side edge of the respective raceways having a shoulder, a recess 150, 150' is provided at the transition from the raceway to the shoulder. The shoulders of the respective side flanks 114, 114'; 124, 124' extend approximately to a third of the transverse dimension of the end faces of the respective rolling element 140, 140'.

A free side edge, that is to say without respective side flanks 114, 114', of the raceways 112, 112' worked into the inner ring 110 and a free side edge, that is to say without respective side flanks 124, 124', of the raceways 122, 122' worked into the outer ring 120 protrude beyond the respective end face 142, 144; 142', 144' of the rolling elements 140, 140' in the direction towards the longitudinal center axis LM thereof.

Analogously, in the variant of the angular contact roller bearing 100 according to FIG. 3, which illustrates an X-arrangement of the angular contact roller bearing 100, only an outer side flank of the raceway 112, 112' worked into the inner ring 110 and an inner side flank of the raceway 122, 122' worked into the outer ring 120 have a respective shoulder on which a respective end face 142, 144; 142', 144' of the rolling elements 140, 140' rests. An inner side edge of the raceways 112, 112' worked into the inner ring 110, 110' and an outer side edge of the raceways 122, 122' worked into the outer ring 120 thereby protrude beyond the respective end face 142, 144; 142', 144' of the rolling elements 140, 140' in the direction towards the longitudinal center axis LM thereof. in the direction towards the longitudinal center axis LM thereof.

At least at their respective open side edges, the respective raceways 112, 112'; 122, 122' are at least as wide as the rolling elements 140, 140' are long. The raceways 112, 112'; 122, 122' are surface-finished/hardened over their entire width.

For mounting the rolling elements in the angular contact roller bearing 100, filling openings 172, 172' which can be closed by filler plugs 170, 170' are provided, which filling openings extend radially from an outer surface 126 of the outer ring 120 through the outer ring 120 to the respective raceway 122, 122' or extend radially from an inner surface 116 of the inner ring 110 through the inner ring 110 to the respective raceway 112, 112' and are so dimensioned that the rolling elements 140, 140' can be introduced into the angular contact roller bearing 100 approximately in their operating position.

It is apparent that, in the angular contact roller bearings presented here, the outer ring 120 has a smallest inside diameter IDO and the inner ring 110 has a largest outside diameter ODI, wherein the smallest inside diameter IDO of the outer ring 120 is larger than the largest outside diameter of the inner ring ODI. Otherwise, the rings cannot be pushed one inside the other.

Figure 4:
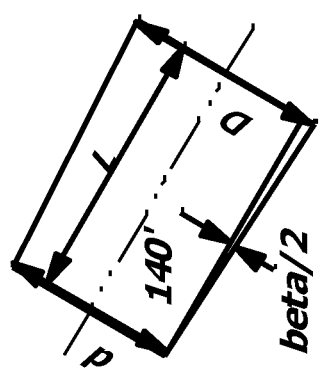
FIG. 4 shows, in a schematic sectional side view, the schematic construction of a variant of a tapered roller of the angular contact roller bearing of FIG. 1 or 3.

As is illustrated in FIG. 4, in the case of angular contact roller bearings of variants presented here whose rolling elements 140, 140' are in slightly tapered form, the rolling elements 140, 140' have an angle of taper which is smaller than 5°. The angle of taper can also be smaller than 3° to 0°. The angle of taper beta, which describes the opening angle of the cone, is determined from the diameter D of the large end face of the taper, the diameter d of the small end face of the taper and the length L of the cone as follows: beta=2*a tan(D−d)/2*L. In the case of large bearing diameters of >1 m, the required angle of taper of the tapered rolling body is relatively small.

In the case of the angular contact roller bearings presented here, the inner ring 110 and the outer ring 120 have radially oriented bores 190, 192 for fastening the angular contact roller bearing to an attachment structure.

The variants described hereinbefore of the angular contact roller bearing serve merely for better understanding of the structure, the mode of functioning and the properties of the angular contact roller bearing; they do not limit the disclosure, for example, to the exemplary embodiments. The figures are partly schematic, whereby essential properties and effects are in some cases shown on a significantly enlarged scale in order to clarify the functions, active principles, technical configurations and features.

Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described drive train. Combinations between all the individual implementations in the text, that is to say in every section of the description, in the claims, and also combinations between different variants in the text, in the claims and in the figures, are also included.

The claims also do not limit the disclosure and thus the possible combinations of all the indicated features with one another. All the indicated features are explicitly also disclosed herein individually and in combination with all the other features.

The invention claimed is:

1. A multi-row angular contact roller bearing comprising:
an inner ring, which is not split in the axial direction, and an outer ring, which is not split in the axial direction, between which two or more raceways for a plurality of rolling elements are formed, wherein the rolling elements are adapted to roll in their respective raceways in the peripheral direction of the angular contact roller bearing, and wherein
the respective raceways and the rolling elements have cross-sections which correspond at least approximately to one another,
a cross-section of a rolling element of the rolling elements containing a central longitudinal axis of the rolling element has a rectangular shape and an imaginary diagonal through the cross-section of the rolling element which is arranged for all the rolling elements on a raceway of the angular contact roller bearing on an imaginary surface, wherein the rolling element has a length and a transverse dimension extending transversely to its central longitudinal axis,
a ratio of the transverse dimension of the rolling element to its length is characteristic of an angle at which the raceway of the rolling elements is inclined relative to the central longitudinal axis of the angular contact roller bearing, and
the ratio of the transverse dimension to the length is less than 1 and the surface is frustoconical in shape,
wherein the raceways worked into the inner ring and/or the outer ring are open on a side flank,
wherein the angular contact roller bearing further comprises one of:
an O-arrangement, in which only an inner side flank of the raceway worked into the inner ring and an outer side flank of the raceway worked into the outer ring have a respective shoulder on which a respective end face of the rolling element rests, and in which an outer side edge of the raceway worked into the inner ring and an inner side edge of the raceway worked into the outer ring protrude beyond the respective end face of the rolling element in the direction towards the longitudinal center axis thereof; or
an X-arrangement, in which only an outer side flank of the raceway worked into the inner ring and an inner side flank of the raceway worked into the outer ring have a respective shoulder on which a respective end face of the rolling element rests, and in which an inner side edge of the raceway worked into the inner ring and an outer side edge of the raceway worked into the outer ring protrude beyond the respective end face of the rolling element in the direction towards the longitudinal center axis thereof.

2. The angular contact roller bearing as claimed in claim 1, wherein the angle is given by the relationship alpha=k*atan (transverse dimension of the rolling element/length of the rolling element), where $0.75<=k<=1.25$.

3. The angular contact roller bearing as claimed in claim 1, wherein, at least at the respective open side edges, the respective raceway is at least as wide as the rolling elements are long, and wherein the raceway is surface-finished or hardened over its entire width.

4. The angular contact roller bearing as claimed in claim 1, wherein filling openings which can be closed by filler plugs are provided, which filling openings extend radially from an outer surface of the outer ring through the outer ring to the respective raceway or extend radially from an inner surface of the inner ring through the inner ring to the respective raceway and are so dimensioned that the rolling elements can be introduced into the angular contact roller bearing approximately in their operating position.

5. The angular contact roller bearing as claimed in claim 1, wherein the outer ring has a smallest inside diameter and the inner ring has a largest outside diameter, wherein the smallest inside diameter of the outer ring is larger than the largest outside diameter of the inner ring.

6. The angular contact roller bearing as claimed in claim 1, wherein the inner ring and/or the outer ring has radially oriented bores for fastening the angular contact roller bearing to an attachment structure.

* * * * *